(12) United States Patent
Takami et al.

(10) Patent No.: US 6,827,258 B2
(45) Date of Patent: *Dec. 7, 2004

(54) ELECTRONIC PURSE

(75) Inventors: Yutaka Takami, Yokohama (JP); Kenji Matsumoto, Yokohama (JP); Shigeyuki Itoh, Zushi (JP); Masayuki Inoue, Fujisawa (JP)

(73) Assignees: Hitachi, Ltd., Tokyo (JP); Hitachi Video and Information System, Inc., Yokohama (JP)

(*) Notice: Subject to any disclaimer, the term of this patent is extended or adjusted under 35 U.S.C. 154(b) by 98 days.

This patent is subject to a terminal disclaimer.

(21) Appl. No.: 10/098,409

(22) Filed: Mar. 18, 2002

(65) Prior Publication Data

US 2002/0092906 A1 Jul. 18, 2002

Related U.S. Application Data

(63) Continuation of application No. 09/614,773, filed on Jul. 12, 2000, now Pat. No. 6,382,505, which is a continuation of application No. 08/896,762, filed on Jul. 18, 1997, now Pat. No. 6,189,782.

(30) Foreign Application Priority Data

Jul. 18, 1996 (JP) .............................. 8-187972

(51) Int. Cl.[7] .............................................. G06F 17/60
(52) U.S. Cl. .......................................... 235/379; 902/26
(58) Field of Search ................................ 235/379, 492, 235/380, 487, 381; 902/24, 25, 26; 705/41, 42, 38, 39, 22, 26

(56) References Cited

U.S. PATENT DOCUMENTS 4,454,414 A    6/1984  Benton
4,862,355 A    8/1989  Newman et al.
4,992,646 A    2/1991  Collin
5,030,806 A    7/1991  Collin
5,093,862 A    3/1992  Scwartz
5,111,299 A    5/1992  Aoki et al.
5,352,876 A   10/1994  Watanabe et al.
5,428,684 A    6/1995  Akiyama et al.
5,434,395 A    7/1995  Storck et al.

(List continued on next page.)

FOREIGN PATENT DOCUMENTS

| CA | 2107865 | 10/1993 |
|---|---|---|
| EP | 518808 A2 | 12/1992 |
| EP | 546584 A1 | 6/1993 |
| EP | 0 670 556 A1 | 6/1995 |
| EP | 0 778 691 A2 | 11/1997 |
| GB | 2296361 A | 6/1993 |
| GB | 2 282 683 A | 12/1995 |
| JP | 1-152556 | 6/1989 |
| JP | 2-97184 | 4/1990 |
| JP | 3-92966 | 4/1991 |
| JP | 6-162059 | 6/1994 |
| JP | 8-180154 | 7/1996 |
| WO | 92/21110 | 11/1992 |
| WO | 96/26508 | 8/1996 |
| WO | 96/36024 | 11/1996 |
| WO | 96/36026 | 11/1996 |
| WO | 97/05582 | 2/1997 |

*Primary Examiner*—Karl D Frech
(74) *Attorney, Agent, or Firm*—Antonelli, Terry, Stout & Kraus, LLP

(57) ABSTRACT

A processor automatically sets a direction of transferring electronic money information depending on the existence of IC cards connected to IC connecting portions and the existence of an external device connected to an external device connecting terminal, thus making instructing operations for transferring electronic money information easier.

2 Claims, 7 Drawing Sheets

U.S. PATENT DOCUMENTS

| | | | |
|---|---|---|---|
| 5,521,362 A | 5/1996 | Powers | |
| 5,524,073 A | 6/1996 | Stambler | |
| 5,534,683 A | 7/1996 | Rankl et al. | |
| 5,546,523 A | 8/1996 | Gatto | |
| 5,557,516 A | 9/1996 | Hogan | |
| 5,559,887 A | 9/1996 | Davis et al. | |
| 5,577,121 A | 11/1996 | Davis et al. | |
| 5,644,118 A | 7/1997 | Hayashida | |
| 5,650,604 A | 7/1997 | Marcous et al. | |
| 5,677,955 A | 10/1997 | Doggett et al. | |
| 5,679,945 A | 10/1997 | Renner et al. | |
| 5,691,525 A | 11/1997 | Aoki et al. | |
| 5,734,722 A | 3/1998 | Halpern | |
| 5,744,787 A | 4/1998 | Teicher | |
| 5,748,737 A | 5/1998 | Dagger | |
| 5,754,654 A | 5/1998 | Hiroya et al. | |
| 5,844,218 A | 12/1998 | Kawan et al. | |
| 5,878,141 A | 3/1999 | Daly et al. | |
| 6,003,762 A | 12/1999 | Hayashida | |
| 6,220,510 B1 * | 4/2001 | Everett et al. | 235/380 |
| 6,601,771 B2 * | 8/2003 | Charrin | 235/492 |

* cited by examiner

ELECTRONIC PURSE

CROSS-REFERENCE TO RELATED APPLICATIONS

This application is a continuation of Ser. No. 09/614,773 filed 12 Jul. 2000 and issued 7 May 2002 as U.S. Pat. No. 6,382,505, which is a continuation of Ser. No. 08/896,762 filed 18 Jul. 1997 and issued 20 Feb. 2001 as U.S. Pat. No. 6,189,782.

BACKGROUND OF THE INVENTION

1. Field of the Invention

The present invention relates to an electronic purse having a settling function, suitable for an electronic money system which transfers electric information (electronic money information), i.e., a value (amount of money) corresponding to the amount of money stored in an IC card, instead of actually transferring that money, and in particular, to an electronic purse which transfers electronic money information (amount of money information) through communication lines such as public telephone lines.

2. Description of Related Art

Conventionally, in an electronic money system transferring electronic money information corresponding to an amount of money, instead of actual money, transferring of electronic money information is performed, as described in Japanese Patent Laid-Open (KOKAI) No. 3-92966 for example, in such a manner that each person having an IC card, visits a shop, an automatic vending machine, or a bank (hereinafter, generally referred to as "shop" for simplicity), and uses a terminal unit installed in each shop. When each person wishes to receive electronic money information, they must visit a shop having a terminal unit and insert their IC card into the terminal unit to receive replenishment of electronic money.

The terminal unit installed in a shop functions to carry out transactions using input of values of electronic money information. However, to draw the balance from one's account to leave a balance of nothing, it is necessary to input a value of electronic money information, which is a troublesome operation.

Further, the terminal unit installed in a shop functions to carry out active transactions in which a value of electronic money information and a direction of transfer, i.e., indication of receipt or payment, are inputted. However, it is not constructed to be compatible with a passive function which works on a transaction partner's designation of a value of electronic money information and a direction of transfer.

The electronic money system described in Japanese Patent Laid-Open (KOKAI) No. 6-162059 proposes electronic purses which can be connected through a telephone communication means. However, it does not disclose means for improving the above-described troublesome operation or insufficient function.

SUMMARY OF THE INVENTION

An electronic purse in the conventional electronic money system is troublesome in its operation, because many instructing operations are required for payment and receipt of electronic money information. For example, it is necessary to select and set a direction of transferring electronic money information from many choices. Even to transfer a given value of electronic money information, as in the case of remittance of the entire balance or of a fixed amount, that value must be set explicitly.

Further, it has been impossible to reconcile a function of transferring electronic money information in which a transaction partner designates a value of electronic money and a direction of transaction and a function of transaction in which a user performs various settings actively for themselves.

Furthermore, when electronic money information is received and sent through public telephone lines, receipt and sending of voice information is stopped during the receipt and sending of the electronic money information and a silent state exists, and it is therefore difficult to confirm that the system is working. Further, transfer of voice information through the telephone communication lines becomes impossible.

Thus, an object of the present invention is to simplify instructing operations for transferring electronic money information. To give more detail, the present invention reduces instructing operations in setting a direction of transferring electronic money information and a value to be transferred.

Another object of the invention is to make it possible to transfer electronic money information without setting a value to be transferred and a direction of transfer, for oneself.

Another object of the invention is to make it possible to confirm easily that the system is working.

Still another object of the invention is to make it possible to transfer voice information while electronic money information is being sent or being received.

To accomplish the above-described objects, in the first mode of the present invention, there is provided an electronic purse comprising:

- IC card connecting means for connecting to an IC card storing electronic money information;
- IC card reading and writing means for reading or writing information from or into the IC card connected to said IC card connecting means;
- a control means for controlling reading and writing of electronic money information in the IC card; and
- an external device connecting terminal for sending and receiving electronic money information to and from an external device; and
- a switching means for making it possible to mutually receive and send electronic money information between said IC card reading and writing means and said external device connecting terminal, and an external device detecting means for detecting a response from an external device connected to said external device connecting terminal;
- wherein when said external device detecting means detects connection of the external device, said control means sets said switching means so that electronic money information in said IC card can pass between said external device connecting terminal and said IC card reading and writing means, making it possible to send and receive electronic money information between said external device and said IC card.

According to this mode of the invention, it is possible to reduce choices of directions of transferring electronic money information, simplifying instructing operations.

The electronic purse may be provided with a lump-sum remittance button for giving instructions of lump-sum sending of electronic money information stored in an IC card and a lump-sum remittance button operation detecting means for detecting an operation signal indicating that this button has been operated, so that, when the lump-sum remittance button is operated, the control means performs such control processing that all the electronic money information stored in said IC card or a user-set value is sent in the lump sum to the external device connected to the external device connecting terminal.

This simplifies instructing operations for setting a choice of a direction of transferring electronic money information and a value of electronic money information to be transferred.

Further, the electronic purse may be provided with a lump-sum drawing button for giving instructions of receiving all the electronic money information stored in the external device connected to the external device connecting terminal, so that when the lump-sum drawing button is operated, the control means performs such control processing that all the electronic money information which is stored in and received from the external device or a user-set value is received by the IC card through said external device connecting terminal.

This simplifies instructing operations for setting a choice of a direction of transferring electronic money information and an amount of money to be drawn.

According to the second mode of the present invention, there is provided an electronic purse comprising:

IC card connecting means for connecting to an IC card storing electronic money information;

IC card reading and writing means for reading or writing information from or into the IC card connected to said IC card connecting means;

a control means for controlling reading and writing of electronic money information from and into the IC card;

an external device connecting terminal for sending and receiving electronic money information to and from an external device;

a transaction button for giving instructions of sending and receiving electronic money information to and from the IC card;

a numerical input means for inputting a value of electronic money information to be dealt with;

an instruction decision button for inputting decision of instructions; and a remittance direction detecting means for detecting electronic money information transfer direction data inputted from the external device through the external device connecting terminal, and a transfer direction setting means for setting a direction of transferring electronic money information in relation to the IC card;

wherein, when, after operation of the transaction button is detected, and the instruction decision button is operated while the numerical input means is not operated, the control means sets the transfer direction setting means in accordance with electronic money information transfer direction data detected by the remittance direction detecting means.

According to this mode of the invention, it is possible to transfer electronic money information without setting an amount of money to be transferred and a direction of transfer, for oneself.

According to the third mode of the present invention, there is provided an electronic purse comprising:

IC card connecting means for connecting to an IC card storing electronic money information;

IC card reading and writing means for reading or writing information from or into the IC card connected to the IC card connecting means;

a modem for sending and receiving electronic money information to and from an external device through a communication line;

a transaction button for giving instructions of sending and receiving electronic money information to and from the IC card;

telephone receiver means for outputting voice information received through the communication line;

line switching means for switching the communication line to the modem or to the telephone receiver means; and a voice information storage means for storing voice information, and voice connecting means for supplying the voice information stored in the voice information storage means to the telephone receiver means;

wherein, when the transaction button is operated, the communication line is connected to the modem while the voice information is supplied to the telephone receiver means; and while electronic money information of the IC card is sent or received to or from the external device through the modem and the communication line, said voice information such as a piece of music or a message is outputted through the telephone receiver means.

Accordingly, it is possible to confirm easily that the system is working.

Further, according to the fourth mode of the invention, there is provided an electronic purse comprising:

IC card connecting means for connecting to an IC card storing electronic money information;

IC card reading and writing means for reading or writing information from or into the IC card connected to the IC card connecting means;

a modem for sending and receiving electronic money information to and from an external device through a communication line;

a transaction button for giving instructions of sending and receiving electronic money information to and from the IC card; and a telephone transmitter-receiver means for talking by means of voice information sent and received through the communication line, and a line superposition means for sending and receiving signals of the modem and the telephone transmitter-receiver means in a superposed manner to and from the communication line;

wherein when the transaction button is operated, it is made possible to send and receive voice information such as a piece of music or a message through the line superposition means, and to input and output the voice information through the telephone transmitter-receiver means, while electronic money information is sent or received to and from the external device through the line superposition means and the modem.

Accordingly, it is possible to transfer voice information while electronic money information is being sent or received.

DETAILED DESCRIPTION OF THE PREFERRED EMBODIMENTS

Figure 1:
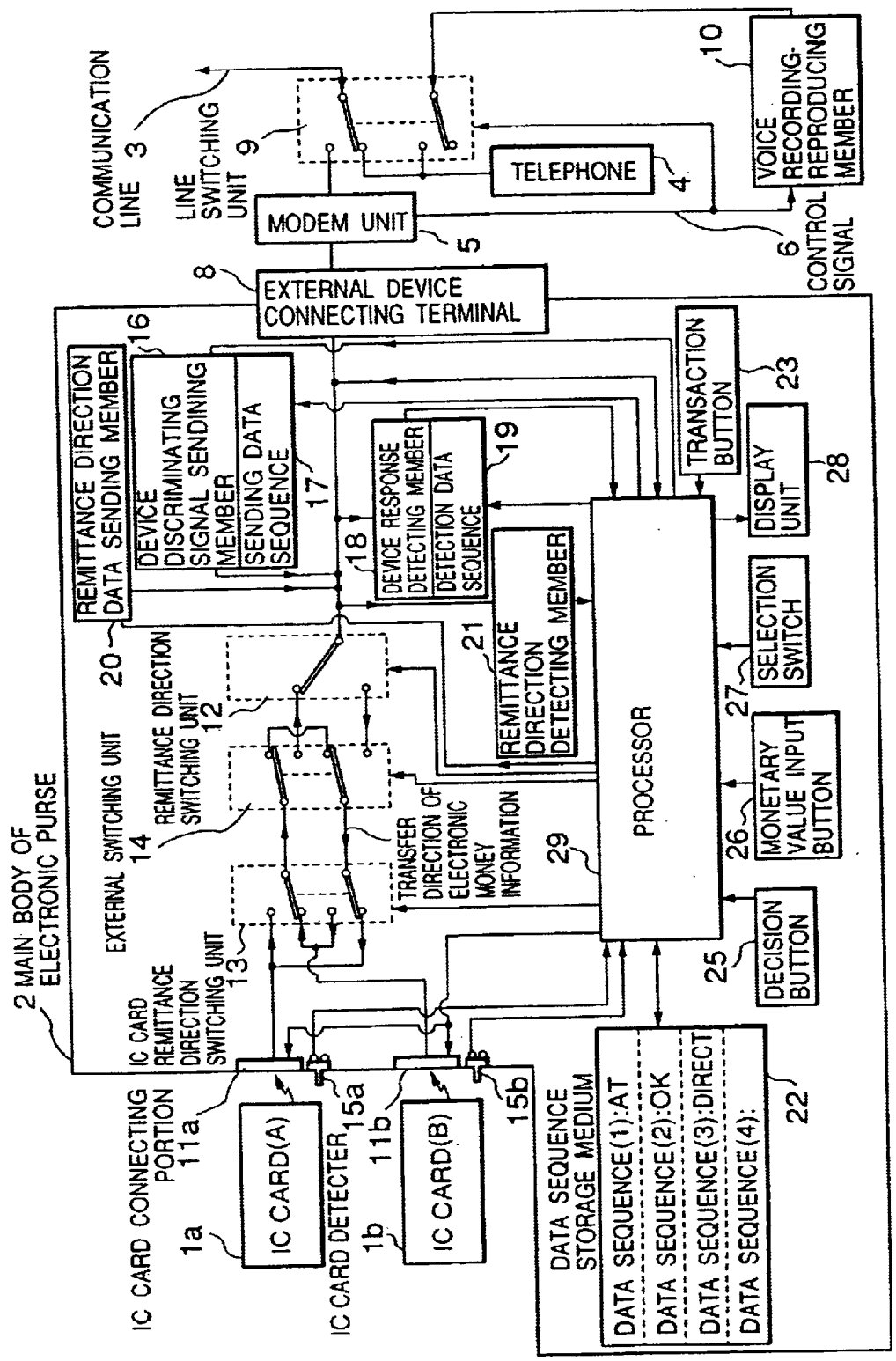
FIG. 1 is a block diagram showing a configuration of the first embodiment of the electronic purse according to the present invention.

The first embodiment of the electronic purse according to the present invention will be described referring to FIGS. 1–5. FIG. 1 is a block diagram showing a configuration of the first embodiment of the electronic purse according to the present invention.

The reference numeral 1 (1a, 1b) refers to an IC card storing electronic money information, 2 to a main body of the electronic purse, 3 to a public telephone communication line, 4 to a telephone to be connected with the communication line 3 for voice communication, 5 to a modem unit connecting the line 3 and the main body 2 of the electronic purse, 8 to an external device connecting terminal provided in the main body 2 of the electronic purse, and 9 to a line switching unit for switching the communication line 5 to the telephone 4 or to the modem unit 5 depending on a control signal 6 from the modem unit 5. The reference numeral 10 refers to a voice recording-reproducing unit connected to the telephone 4 by the line switching unit 9, 11 (11a, 11b) to an IC card connecting portion to which an IC card 1 (1a, 1b) is detachably connected for sending and receiving electronic money information, 12 to a remittance direction switching unit for setting a direction of transferring electronic money information with respect to the external device connecting terminal 8, 13 to an IC card remittance direction switching unit for setting a direction of transferring electronic money information between the IC cards 1a and 1b, 14 to an external switching unit for setting either connection of the IC cards 1a, 1b with each other or connection with the external device connecting terminal 8, 15 (15a, 15b) to an IC card detector for detecting if the IC card 1 (1a, 1b) is connected to the IC card connecting portion 11a or 11b or not, 16 to a device discriminating signal sending member for sending a sending data sequence 17 through the external device connecting terminal 8 for discriminating a device, 18 to a device response detecting member for detecting a detection data sequence 19 inputted through the external device connecting terminal 8 for discriminating a device, 20 to a remittance direction data sending member for sending data indicating a remittance direction through the external device connecting terminal 8, 21 to a remittance direction detecting member for detecting data indicating a remittance direction inputted through the external device connecting terminal 8, 22 to a data sequence storage medium which stores data sequences, 23 to a transaction button which is operated when a user instructs start of the transfer of electronic money information, 25 to a decision button for a user to instruct the main body 2 of the electronic purse to decide operation setting, 26 to an amount of money input button for setting a value (transfer value) of electronic money information to be transferred, 27 to a selection switch for instructing and inputting a direction of transferring electronic money information, 28 to a display unit for displaying a value inputted by the amount of money input button 26 and a direction of transferring electronic money information, which can be selected by the selection switch 27, and the like, and 29 to a processor which performs control processing for processing, inputting and outputting electronic money information and other information signals in the main body 2 of the electronic purse of this embodiment.

Here, the remittance direction switching unit 12, IC card remittance direction switching unit 13, external switching unit 14, device discriminating signal sending member 16, device response detecting member 18, remittance direction data sending member 20, remittance direction detecting member 21, and processor 29 are, in fact, functional means constructed by CPU, programs, memory, and the like.

Figure 2:
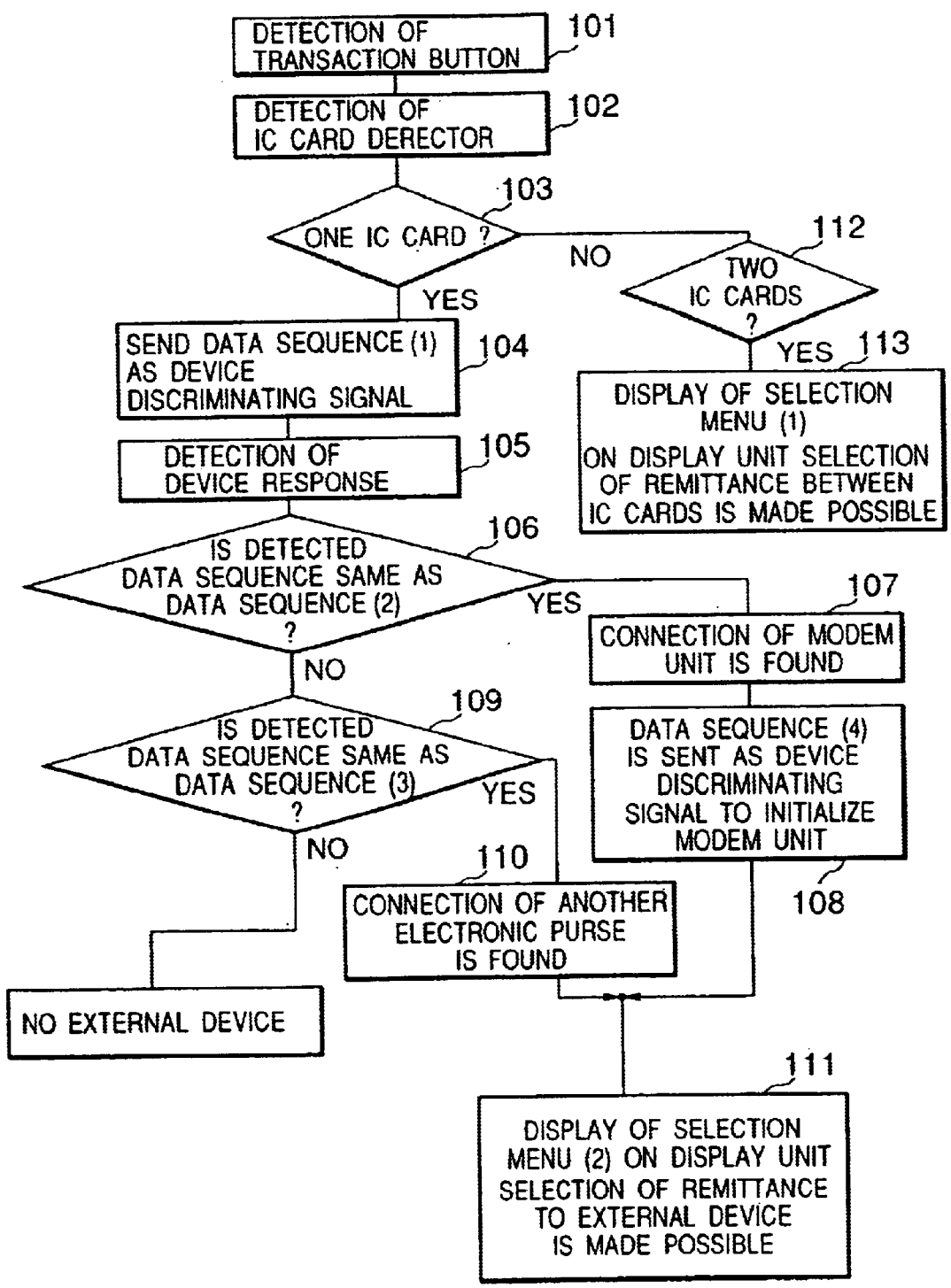
FIG. 2 is a flowchart showing control processing performed by a processor in the electronic purse according to the present invention.

Now, operation of the electronic purse having the above-described construction will be described referring to FIGS. 2–5. FIG. 2 is a flowchart of the processing operation mainly in the processor 29, showing processing from detection of an operation input signal of the transaction button 23 in the electronic purse shown in FIG. 1 to selective instruction of a direction of transferring electronic money information (direction of remittance).

When the processor 29 detects the operation input signal of the transaction button 23 in Step 101, it goes to Step 102 and detects output signals of the IC card detectors 15a, 15b. In Step 103, if it is confirmed that only one of the IC cards 1a, 1b is connected to the IC card connecting portion 11a or 11b, it goes to Step 104, causing the device discriminating signal sending member 16 to send a sending data sequence (1) 17 to the external device connecting terminal 8. At this time, as the sending data sequence (1) 17, there is used a data sequence (1) which has been written into the data storage member 22. A device connected to the external device connecting terminal 8, the modem unit 5 in this embodiment, replies to this sending data sequence (1) 17. The returned response is received by the device response detecting member 18. The detection data sequence 19 received by the device response detecting member 18 is introduced in Step 105, and in the next Step 106, this detection data sequence 19 is compared with a data sequence (2). At this time, as the data sequence (2), there is used a data sequence (2) which has been written into the data storage member 22. In the comparison of Step 106, if it is confirmed that the detection data sequence 19 is the same sequence as the data sequence (2), it goes to Step 107, judging that the modem unit 5 is connected to the main body 2 of the electronic purse. Thereafter, in Step 108, the modem unit 5 is initialized as required, by sending a data sequence (4) which has been written into the data storage member 22.

In the comparison of the above-described Step 106, in the case that the detected detection data sequence 19 is different from the data sequence (2) written into the data storage member 22, it goes to Step 109, comparing the detection data sequence 19 with the next data sequence (3) written into the data storage member 22. In the present embodiment, the data sequence (3) is the data sequence used by the main body 2 of the electronic purse for response when it receives the same data sequence as the data sequence (1) written into the data storage member 22, via the external device connecting terminal 8. Thus, if the detection data sequence 19 is the same as the data sequence (3), it goes to Step 110, recognizing that another usable main body of the electronic purse is connected directly to the external device connecting terminal 8.

When the processor 29 recognizes that a usable device is connected to the external device connecting terminal 8, it goes to Step 111, displaying a selection menu (2) screen on the display unit 28 for allowing selective instruction of a direction of transferring electronic money information, and entry into remittance (transfer of electronic money information) control processing in relation to the external device.

In the case that, in Step 103 and Step 112, two IC cards 1a, 1b connected to the two IC card connecting portions 11a, 11b are detected, it goes to Step 113, and in the present embodiment, a selection menu (1) screen is always displayed, which allows selective instruction of a direction of transferring electronic money information between the two IC cards 1a, 1b, regardless of the fact that an external device is connected to the external device connection terminal 8, and the process flow enters remittance (transfer of electronic money information) control processing between the IC cards.

Figure 3:
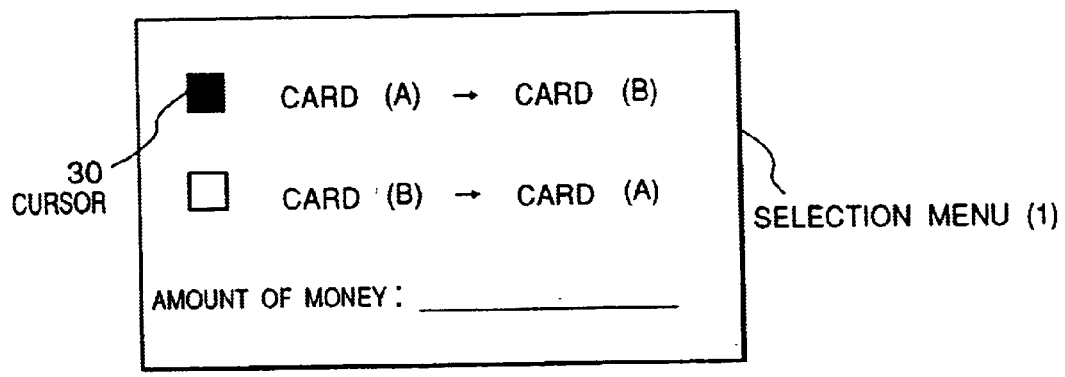
FIG. 3 is a selection menu screen in the electronic purse of FIG. 1 according to the present invention.

Next, these selection menu screens will be described referring to FIGS. 3 and 4. FIG. 3 is the selection menu (1) screen in the case that two IC cards 1a, 1b are connected. By operating the selection switch 27 to move a cursor 30, it is possible to selectively instruct a direction of transferring electronic money information.

Figure 4:
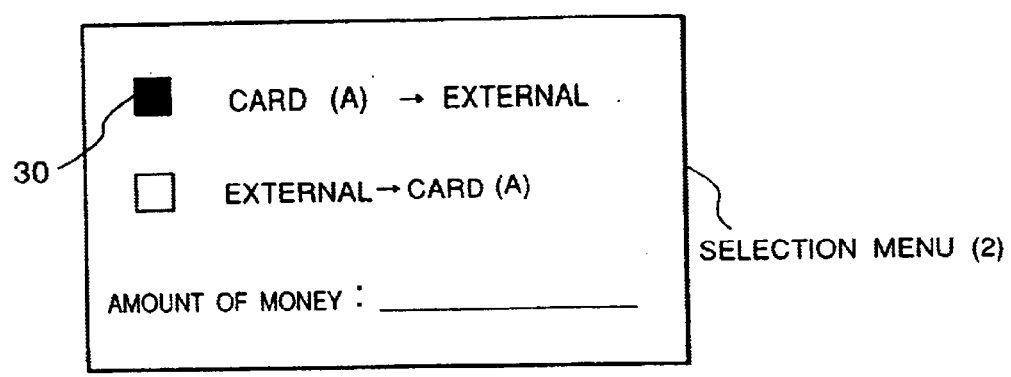
FIG. 4 is another selection menu screen in the electronic purse of FIG. 1 according to the present invention.

FIG. 4 is the selection menu (2) screen in the case that one IC card 1a (1b) is connected. As in the selection menu (1) screen shown in FIG. 3, the selection switch 27 is operated to move the cursor 30 so as to selectively instruct a direction of transferring electronic money information.

Now, referring to FIG. 5, there will be described processing operations for transferring electronic money information in the case that, in the selection menu (2) screen shown in FIG. 4, the selection switch 27 is operated to selectively instruct a direction of electronic money information, and a value of electronic money information to be transferred is inputted by the amount of money button 26, and thereafter the decision button 25 is pushed. The case will also be described where the decision button 25 is pushed without operating the amount of money button 26.

Figure 5:
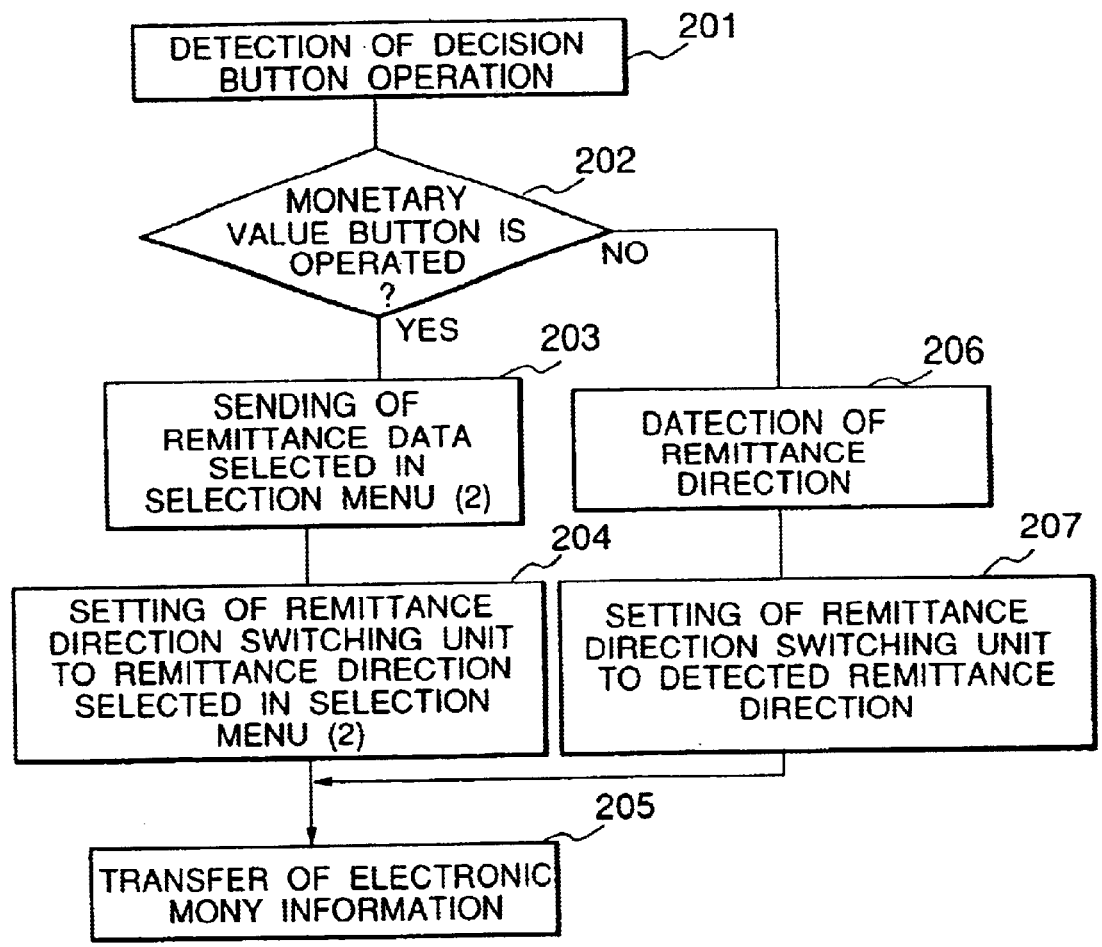
FIG. 5 is a flowchart showing control processing performed by a control means in the electronic purse of FIG. 1 according to the present invention.

FIG. 5 is a flowchart of control processing operations in the processor 29, showing from the selection menu (2) screen shown in FIG. 4 for execution of transfer of electronic money information.

In Step 201, if operation of the decision button 25 is detected, it goes to Step 202, where it is judged if a value of electronic money information (amount of money to be transferred) has been set by operation of the amount of money button 26 before the operation of the decision button 25. In the case that the value of electronic money information to be transferred has been set, it goes to Step 203, where, first of all, the modem unit 5 is controlled through the external device connecting terminal 8 to make it possible to transfer electronic money information through the communication line 3. Next, in accordance with the set value of the transfer direction selected on the selection menu (2) screen shown in FIG. 4, the remittance direction data sending member 20 is made to send data indicating the direction of transferring electronic money information. After that, it goes to Step 204 where the IC card remittance direction switching unit 13, external switching unit 14, and remittance direction switching unit 12 are set, and then, to Step 205 where electronic money information is transferred to or from the other device through the modem unit 5 and the communication line 3.

On the other hand, in the case that a value of electronic money information to be transferred (amount of money to be transferred) has not been set by operating the amount of money button 26 before the operation of the decision button 25, the process goes from Step 202 to Step 206, where, first of all, the modem unit 5 is controlled through the external device connecting terminal 8 to make it possible to transfer electronic money information through the communication line 3. Next, based on data indicating a direction of remittance, sent from the other device and detected by the remittance direction detecting member 21, the transfer direction is detected. Then, it goes to Step 205, where the IC card remittance direction switching unit 13, external switching unit 14, and remittance direction switching unit 12 are set, and further to Step 205 to execute transfer of electronic money information to or from the other device through the modem unit 5 and the communication line 3.

In the above-described control processing operation for transferring electronic money information, in the present embodiment, it is defined that a device to be connected through the communication line 3 is ordinarily connected by a line connecting operation using the telephone 4 which is to be connected to the communication line 3 by the line switching unit 9. Thereafter, the processor 29 controls the modem unit 5, and its control signal 6 controls the line switching unit 9 for transferring electronic money information. The line switching unit 9 connects the modem unit 5 to the communication line 3, while separating the telephone 4 from the communication line 3 and connecting it to an output circuit of the voice recording-reproducing member 10. The voice recording-reproducing member 10 outputs a holding tone recorded in advance.

Next, there will be described the effects of the above-described first embodiment of the electronic purse according to the present invention, which performs the various operations described above.

In the present embodiment, a direction of transferring electronic money information between IC cards or in relation to another external device can be easily set according to the number of connected IC card(s) 1 and construction of a connected device, by simply pushing the transaction button 23. At that time, it is automatically judged if the external device can be used or not. As for the selection of functions, selective instructions required from a user are only necessary as minimum ones, thus making the instructing operations easy.

In the present embodiment, when two IC cards 1a, 1b are connected, an external device connected to the external device connecting terminal 8 is not detected, because transfer of electronic money information is interpreted as one between these two IC cards, thus reducing the available choices. However, in an embodiment where a larger number of choices are allowed, it may be also detected if an external device is connected to the external device connecting terminal 8, and when an external device is thus connected, all the combinations of transfer of electronic money information considering the external device too are displayed as choices, so that control of transferring electronic money information can be performed including that external device. In that case, initial data for a transfer direction may be made as a transfer between the IC cards, which simplifies the instructing operations for selecting a transfer direction.

When it is not necessary to decide a transfer direction, by operating the decision button 25 just after operation of the transaction button 23, a transfer direction is set in accordance with remittance direction data given from another device connected externally, and thus the selection operation becomes unnecessary.

Data sequences used for discriminating external devices are stored in the data sequence storage medium 22 provided separately from the processor 29. As a result, by exchanging the data sequence storage medium 22, data sequences used for discriminating external devices can be changed easily.

The telephone 4 used for the line connecting operation is separated from the communication line 3 during sending and receiving of electronic money information, and connected to the voice recording-reproducing member 10. So that a holding tone is generated. As a result, a user can know from the sound that the purse is in the middle of the operation of sending or receiving electronic money information.

Figure 6:
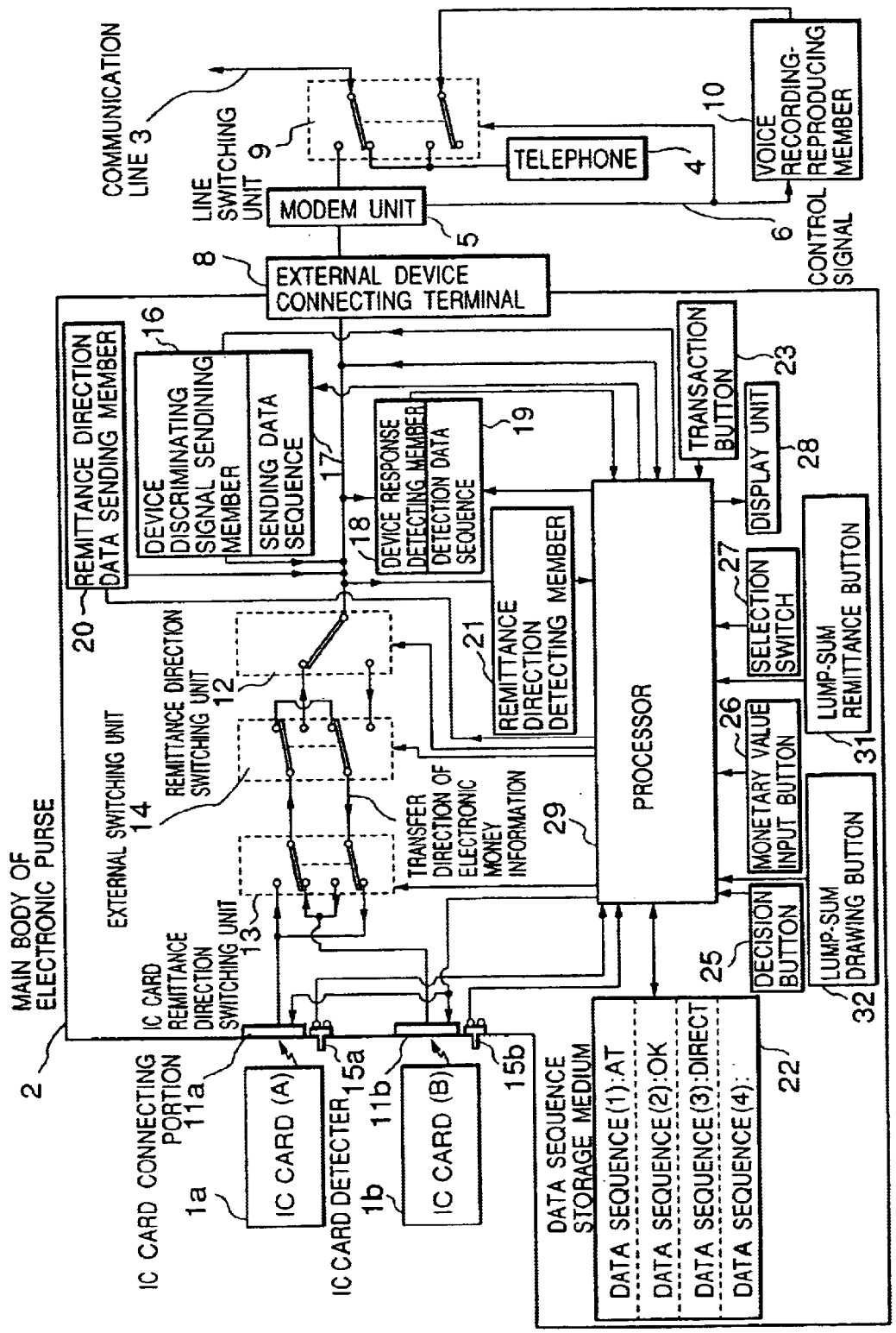
FIG. 6 is a block diagram showing a configuration of the second embodiment of the electronic purse according to the present invention.

Next, referring to FIG. 6, the second embodiment of the electronic purse according to the present invention will be described. FIG. 6 is a block diagram showing a configuration of the second embodiment of the electronic purse according to the present invention. The same numerals are used for components identical to the first embodiment, and repeated description is omitted.

In the second embodiment, differing from the first embodiment, there are added a lump-sum remittance function and lump-sum drawing function, and a lump-sum remittance button 31 and lump-sum drawing button 32 are also provided. The lump-sum remittance function is a function for remitting (transmitting), in a lump-sum, electronic money information stored in the IC card 1a (1b) connected to the IC card connecting portion 11a (11b). The lump-sum drawing function is a function for drawing, in a lump-sum, all the electronic money information which can be received from an external device connected through the communication line 3. Control processing for realizing these functions are attained by executing programs built into the processor 29.

In the second embodiment, when an operating signal is inputted from the lump-sum remittance button 31, the processor 29 first of all detects output signals of the IC card detectors 15a, 15b. In the case that one IC card 1a (1b) is connected to the IC card connecting portions 11a, 11b, a value of electronic money information stored in this IC card 1a (1b) is read. Next, the modem unit 5 connected to the external device connecting terminal 8 is detected. Thereafter, control processing is performed such that all the values of electronic money information read out are sent to another device connected through the modem unit 5 and the communication line 3. In this second embodiment, by operating one button 31, the processing is performed until sending of the electronic money information to the external device is completed.

Next, when an operation signal from the lump-sum button 32 is inputted (the first time), output signals of the IC card detectors 15a, 15b are detected first of all. In the case that one IC card 1a (1b) is connected to the IC card connecting portions 11a, 11b, the modem unit 5 connected to the external device connecting terminal 8 is detected. Next, by controlling the modem unit 5, information on a value of electronic money information which can be obtained from the other device through the communication line 3 is obtained, and displayed on the display unit 28 as balance information. Then, the operation signal from this lump-sum drawing button 32 is inputted (the second time), control processing is performed for receiving all the value of obtainable electronic money information from the other device through the modem unit 5 and the communication line 3. Without operations based on the instructions from the other device, this processing can be performed until the control processing for receiving the electronic money information from the other device is completed by operating one button 32.

According to the second embodiment, the following effects are obtained.

In the second embodiment, operation of only one button 31 can perform remittance of the entire amount of electronic money information stored in the IC card 1a (1b), in a lump sum, to other devices, for example, a device installed in a bank. Further, by operating only one button 32, it is possible to receive all the electronic money information which is stored in and can be drawn from another device, for example, a device installed in a bank.

In describing the second embodiment, there has been shown, as an example, the control processing for receiving all the electronic money information which is stored in and can be drawn from another device, by operating the lump-sum drawing button 32. If necessary, a fixed amount of electronic money information, which has been decided in advance, may be drawn in a lump sum.

Figure 7:
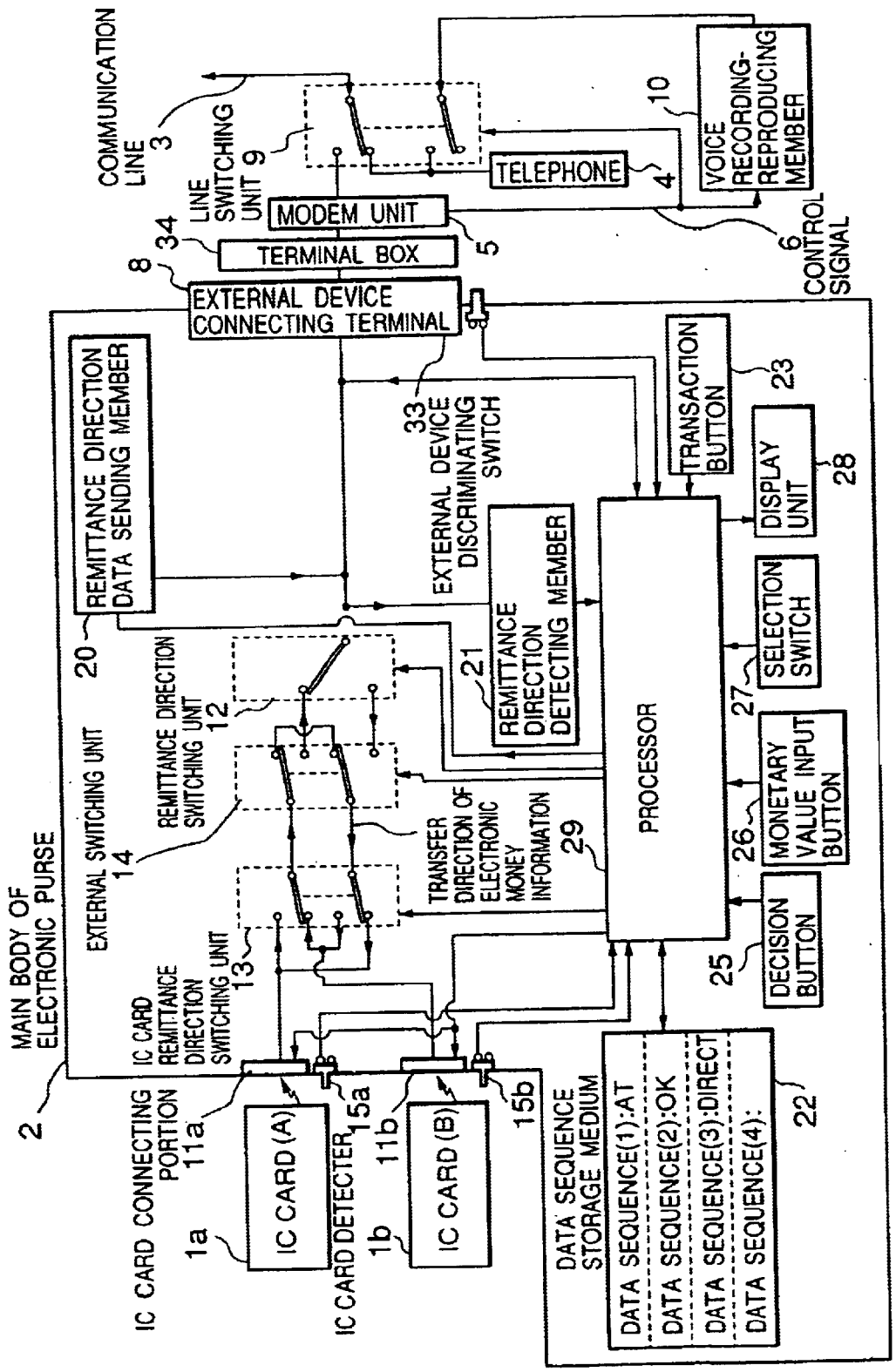
FIG. 7 is a block diagram showing a configuration of the third embodiment of the electronic purse according to the present invention.

Next, referring to FIG. 7, the third embodiment of the electronic purse according to the present invention will be described. FIG. 7 is a block diagram showing a configuration of the third embodiment of the electronic purse according to the present invention. The same numerals are used for components identical to the first embodiment, and repeated description is omitted.

The third embodiment is different from the first embodiment in that an external device discriminating switch 33 is provided to discriminate connection of external devices. This external device discriminating switch 33 is provided adjacent to the external device connecting terminal 8, and is constructed so that when a terminal box 34 on the side of the modem unit 5 abuts onto it, the switch is turned on. The processor 29 inputs an output signal of the external device discriminating switch 33, and judges if an external device is connected to the external device connecting terminal 8.

When the terminal box 34 on the side of the modem unit 5 is connected to the external device connecting terminal 8, the external device discriminating switch 33 is operated, and its signal is transferred to the processor 29. In the present embodiment, this signal from the external device discriminating terminal 33 is used for detecting (discriminating) if an external device is connected to the external device connecting terminal 8 or not. Other control processing is the same as in the first embodiment.

Since the signal from the external discriminating switch 33 is used for discriminating if an external device is connected to the external device connecting terminal 8, the control processing is simpler than the first embodiment. Although, in the present embodiment, the signal for discriminating an external device is generated by the external device discriminating switch 33, of course, similar effects can be obtained, for example, by employing such a construction that a signal is sent from an external device to a terminal of the external device connecting terminal 8, and the processor 28 receives this signal to detect connection of the external device.

Figure 8:
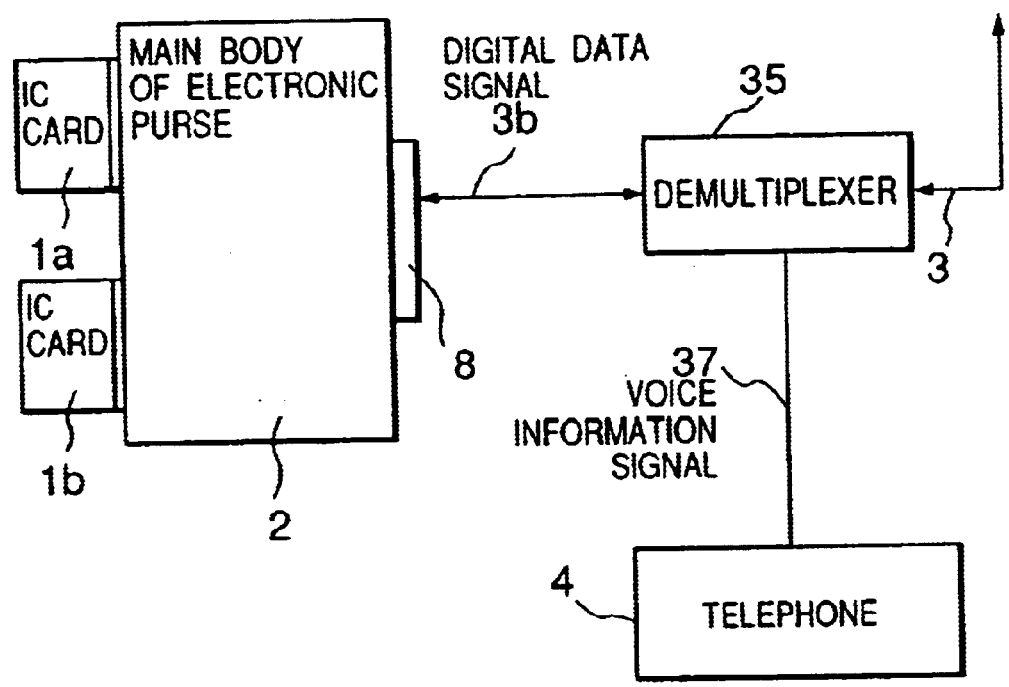
FIG. 8 is a block diagram showing a configuration of the fourth embodiment of the electronic purse according to the present invention.

Next, referring to FIG. 8, the fourth embodiment of the electronic purse according to the present invention will be described. FIG. 8 is a block diagram showing a configuration of the fourth embodiment of the electronic purse according to the present invention. The same numerals are used for components identical to the first embodiment, and repeated description is omitted.

This fourth embodiment is different from the first embodiment in that transfer of electronic money information is performed in parallel with transfer of voice information. A demultiplexer 35 separates a signal obtained through the communication line 3 into a digital data signal 36 and a voice information signal 37, and makes the voice signal 37 branch to the telephone 4. On the other hand, the digital data signal 36 is made to branch to the main body 2 of the electronic purse through the external device connecting terminal 8 for transferring electronic money information.

In this fourth embodiment, line connecting control through the communication line 3 is performed by the telephone 4 as in the first embodiment. After the connection of the line, transfer of electronic money information is performed using the digital data signal 36. At that time, the telephone 4 sends and receives the voice information signal. Other operations are the same as the first embodiment.

According to such an embodiment, it possible to send and receive the voice information signal using the telephone 4 while electronic money information is sent or received, so that guidance of an operation method of the main body 2 of the electronic purse or other voice information can be sent and received or outputted as sound.

As described above, according to the present invention, when an external device is connected to the external device connecting terminal 8, the control processing can be performed so that electronic money is automatically transferred between an IC card and the external device, thus obtaining easier instructing operations for transferring electronic money information.

Further, owing to the lump-sum sending function and lump-sum drawing function, a user can transfer electronic money information without setting a value to be transferred and a transfer direction.

Further, whether or not the device is working is easily confirmed by supplying sound from the telephone during sending and receiving of electronic money information.

Still further, electronic money information and voice information are sent and received in a superposed manner by the line superposition means, so that voice information can be transferred during sending and receiving of electronic money information.

What is claimed is:

1. An electronic purse for processing electronic money information stored in an IC card, comprising:

an IC card reading and writing unit to read or write information from or into said IC card;

an operation control unit to process electronic money information read out by said IC card reading and writing unit;

a transmission unit to transmit said electronic money information read out by said IC card reading and writing unit to an external device;

a lump sum transmission instruction button to allow a user to input instructions to transmit in a lump a predetermined amount of said electronic money information stored in said IC card; and a lump sum transmission instruction detecting unit to detect an operation of said lump sum transmission instruction button, wherein, when said lump sum transmission instruction detecting unit detects said operation of said lump sum transmission instruction button, said operation control unit controls so that the predetermined amount of said electronic money information stored in said IC card is transmitted in a lump to said external device via said transmission unit without a further operation for inputting a value showing an amount to be transmitted in a lump.

2. An electronic purse for processing electronic money information stored in an IC card; comprising:

an IC card reading and writing unit to read or write information from or into said IC card;

an operation control unit to process electronic money information read out by said IC card reading and writing unit;

a receiving unit to receive said electronic money information transmitted from an external device;

a lump sum drawing instruction button to allow a user to input instructions to draw, in a lump, a predetermined amount of said electronic money information which is receivable from said external device in a lump; and a lump sum drawing instruction detecting unit to detect an operation of said lump sum drawing instruction button, wherein, when said lump sum drawing instruction detecting unit detects said operation of said lump sum drawing instruction button, said operation control unit controls so that the predetermined amount of said electronic money information is drawn from said external device in a lump by said IC card reading and writing unit without a further operation for inputting an amount to be drawn in a lump.

* * * * *